(12) United States Patent  
Gole et al.

(10) Patent No.: US 7,730,153 B1  
(45) Date of Patent: Jun. 1, 2010

(54) EFFICIENT USE OF NVRAM DURING TAKEOVER IN A NODE CLUSTER

(75) Inventors: Abhijeet Gole, Campbell, CA (US); Naveen Bali, Santa Clara, CA (US)

(73) Assignee: NetApp, Inc., Sunnyvale, CA (US)

( * ) Notice: Subject to any disclaimer, the term of this patent is extended or adjusted under 35 U.S.C. 154(b) by 1224 days.

(21) Appl. No.: 10/011,844

(22) Filed: Dec. 4, 2001

(51) Int. Cl.
*G06F 15/167* (2006.01)
*G06F 13/00* (2006.01)
*G06F 13/28* (2006.01)
*G06F 12/00* (2006.01)

(52) U.S. Cl. ................................ 709/215; 711/148
(58) Field of Classification Search ......... 709/200–206, 709/211–219, 220–232, 255, 238, 245–248; 711/147–148, 153, 161–162, 170–174; 714/765, 714/8, 1–4
See application file for complete search history.

(56) References Cited

U.S. PATENT DOCUMENTS

| | | |
|---|---|---|
| 4,937,763 A | 6/1990 | Mott |
| 5,067,099 A | 11/1991 | McCown et al. |
| 5,157,663 A | 10/1992 | Major et al. |
| 5,163,131 A | 11/1992 | Row et al. |
| 5,355,453 A | 10/1994 | Row et al. |
| 5,485,579 A | 1/1996 | Hitz et al. |
| 5,488,716 A * | 1/1996 | Schneider et al. ............. 714/10 |
| 5,633,999 A | 5/1997 | Clowes et al. |
| 5,680,580 A | 10/1997 | Beardsley et al. |
| 5,737,514 A * | 4/1998 | Stiffler ........................ 714/13 |
| 5,781,770 A | 7/1998 | Byers et al. |
| 5,787,459 A * | 7/1998 | Stallmo et al. .............. 711/112 |
| 5,802,366 A | 9/1998 | Row et al. |
| 5,812,748 A * | 9/1998 | Ohran et al. ................... 714/4 |
| 5,812,751 A * | 9/1998 | Ekrot et al. .................... 714/4 |
| 5,819,292 A | 10/1998 | Hitz et al. |
| 5,907,849 A * | 5/1999 | Dias et al. .................. 707/202 |
| 5,931,918 A | 8/1999 | Row et al. |
| 5,941,972 A | 8/1999 | Hoese et al. |
| 5,948,110 A * | 9/1999 | Hitz et al. ....................... 714/6 |
| 5,951,695 A * | 9/1999 | Kolovson .................... 714/16 |
| 5,963,962 A | 10/1999 | Hitz et al. |
| 5,996,086 A * | 11/1999 | Delaney et al. ................. 714/4 |
| 6,035,417 A * | 3/2000 | Kanazawa .................... 714/13 |
| 6,044,444 A * | 3/2000 | Ofek .......................... 711/162 |
| 6,065,037 A | 5/2000 | Hitz et al. |
| 6,119,244 A * | 9/2000 | Schoenthal et al. ............ 714/4 |
| 6,145,068 A * | 11/2000 | Lewis .......................... 711/170 |

(Continued)

FOREIGN PATENT DOCUMENTS

WO  WO 01/35244 A1  5/2001

OTHER PUBLICATIONS

U.S. Appl. No. 09/933,883, Cramer, et al.

(Continued)

*Primary Examiner*—Asad M Nawaz
(74) *Attorney, Agent, or Firm*—Cesari and McKenna LLP (57) ABSTRACT

A server storage system operating in a cluster mode, and a method for operating the server system that provides additional memory for use by a non-failed server to store log records while taking over the operations of a failed server.

23 Claims, 5 Drawing Sheets

U.S. PATENT DOCUMENTS

| | | | |
|---|---|---|---|
| 6,145,089 A * | 11/2000 | Le et al. .......................... 714/4 |
| 6,289,356 B1 | 9/2001 | Hitz et al. |
| 6,292,905 B1 * | 9/2001 | Wallach et al. .................. 714/4 |
| 6,317,844 B1 | 11/2001 | Kleiman |
| 6,425,035 B2 | 7/2002 | Hoese et al. |
| 6,449,734 B1 * | 9/2002 | Shrivastava et al. ............ 714/15 |
| 6,505,305 B1 * | 1/2003 | Olarig ............................ 714/5 |
| 6,526,478 B1 * | 2/2003 | Kirby ........................... 711/114 |
| 6,549,992 B1 * | 4/2003 | Armangau et al. ........... 711/162 |
| 6,578,160 B1 * | 6/2003 | MacHardy et al. ............ 714/43 |
| 6,625,749 B1 | 9/2003 | Quach |
| 6,625,750 B1 * | 9/2003 | Duso et al. ..................... 714/11 |
| 6,658,478 B1 * | 12/2003 | Singhal et al. ............... 709/232 |
| 6,725,392 B1 * | 4/2004 | Frey et al. ...................... 714/6 |
| 6,728,897 B1 * | 4/2004 | Cramer et al. .................. 714/6 |
| 6,775,702 B2 | 8/2004 | Oeda et al. |
| 6,802,022 B1 * | 10/2004 | Olson ............................ 714/6 |
| 6,895,467 B2 * | 5/2005 | Lubbers et al. ............. 711/114 |
| 6,983,322 B1 * | 1/2006 | Tripp et al. ................. 709/225 |
| 6,996,741 B1 * | 2/2006 | Pittelkow et al. ............... 714/5 |
| 7,003,688 B1 * | 2/2006 | Pittelkow et al. ............... 714/7 |
| 7,039,828 B1 * | 5/2006 | Scott ............................ 714/4 |
| 7,043,663 B1 * | 5/2006 | Pittelkow et al. ............... 714/4 |
| 7,069,468 B1 * | 6/2006 | Olson et al. ..................... 714/7 |
| 7,127,633 B1 * | 10/2006 | Olson et al. .................... 714/4 |
| 7,146,465 B2 * | 12/2006 | Korgaonkar ................. 711/114 |
| 2002/0035667 A1 * | 3/2002 | Bruning et al. ............. 711/114 |
| 2002/0133601 A1 * | 9/2002 | Kennamer et al. .......... 709/229 |
| 2002/0138559 A1 * | 9/2002 | Ulrich et al. ................ 709/203 |
| 2002/0156973 A1 * | 10/2002 | Ulrich et al. ................ 711/114 |
| 2003/0005350 A1 * | 1/2003 | Koning et al. .................. 714/4 |
| 2003/0084241 A1 * | 5/2003 | Lubbers et al. ............. 711/114 |
| 2003/0088638 A1 | 5/2003 | Gluck et al. |
| 2004/0010545 A1 | 1/2004 | Pandya |
| 2004/0073831 A1 * | 4/2004 | Yanai et al. .................... 714/7 |
| 2004/0153710 A1 * | 8/2004 | Fair ............................. 714/4 |
| 2005/0066127 A1 * | 3/2005 | Korgaonkar ................. 711/114 |
| 2005/0097275 A1 * | 5/2005 | Korgaonkar ................. 711/114 |
| 2005/0125610 A1 * | 6/2005 | Korgaonkar ................. 711/114 |
| 2006/0031287 A1 * | 2/2006 | Ulrich et al. ................ 709/203 |
| 2006/0117212 A1 * | 6/2006 | Meyer et al. .................. 714/4 |
| 2006/0173956 A1 * | 8/2006 | Ulrich et al. ................ 709/203 |
| 2007/0168518 A1 * | 7/2007 | McCabe et al. ............. 709/226 |

OTHER PUBLICATIONS

European Search Report for Application No. EP 01 01 6755, Nov. 8, 2004 pp. 1-3.

Anupam Bhide, Elmootazbellah N. Elnozahy, Stephen P. Morgan, "A Highly Available Network File Server," Proceedings of the Winter 1991 USENIX Conference, Jan. 21-25, 1991, pp. 199-205.

* cited by examiner

EFFICIENT USE OF NVRAM DURING TAKEOVER IN A NODE CLUSTER

FIELD OF THE INVENTION

The present invention relates to storage systems and more particularly to takeovers by one storage system of another storage system in a cluster of storage systems on a network.

BACKGROUND OF THE INVENTION

A file server is a computer that provides file service relating to the organization of information on writeable persistent storage devices, such memories, tapes or hard disks. The file server or filer may be embodied as a storage system including an operating system that implements a file system to logically organize the information as a hierarchical structure of directories and files on, e.g., the disks. Each "on-disk" file may be implemented as set of data structures, e.g., disk blocks, configured to store information, such as is the actual data for the file. A directory, on the other hand, may be implemented as a specially formatted file in which information about other files and directories are stored. An example of a file system that is configured to operate on a filer is the Write Anywhere File Layout (WAFL™) file system available from Network Appliance, Inc., Sunnyvale, Calif.

As used herein, the term "storage operating system" generally refers to the computer-executable code operable to perform a storage function in a storage system, e.g., that implements file system semantics and manages data access. In this sense, the ONTAP software is an example of such a storage operating system implemented as a microkernel and including a WAFL layer to implement the WAFL file system semantics and manage data access. The storage operating system can also be implemented as an application program operating over a general-purpose operating system, such as UNIX® or Windows NT®, or as a general-purpose operating system with configurable functionality, which is configured for storage applications as described herein.

A filer cluster is organized to include one or more filers or storage "volumes" that comprise a cluster of physical storage disks, defining an overall logical arrangement of storage space. Currently available filer implementations can serve a large number of discrete nodes or volumes. Each volume is generally associated with its own file system (WAFL for example). The disks within a volume/file system are typically organized as one or more groups of Redundant Array of Independent (or Inexpensive) Disks (RAID). RAID 4 implementations enhance the reliability/integrity of data storage through the redundant writing of data "stripes" across a given number of physical disks in the RAID group, and the appropriate storing of parity information with respect to the striped data. In the example of a WAFL-based file system, a RAID 4 implementation is advantageously employed and is preferred. This implementation specifically entails the striping of data bits across a group of disks, and separate parity storage within a selected disk (or disks) of the RAID group.

The Network File System (NFS) is a stateless UNIX based file system protocol used with filers that is generally not used with certain operating systems, such as Windows, running on most personal computers (PCs). The NFS protocol emphasizes error recovery over file locking; such error recovery is simple because no state information need be preserved. However, the protocol can "hang up" for hours without any timeout, which is detrimental. In addition, since NFS is not found in most PC operating systems it is not widely used in filers that are accessed by PC clients.

The Common Internet File System (CIFS) is an open standard, connection oriented protocol providing remote file access over the Internet that is typically used with filers to provide service to PCs. For example, CIFS is used in the Windows NT, 9X, ME and 2000 operating systems, Windows for WorkGroups and LAN Manager. Accordingly, it is widely used with servers, such as filers, that have PC clients accessing them. CIFS is not stateless and emphasizes locking over error recovery. Strict locking requires a sustained connection so it is important that an active session not be interrupted.

It is advantageous for the services and data provided by a storage system to be available for access to the greatest degree possible. Accordingly, some computer storage systems provide a plurality of filers in a cluster, with the property that when a first filer fails, a second filer is available to take over and provide the services and the data otherwise provided by the first filer. The second filer provides these services and data by a "takeover" of resources otherwise managed by the failed first filer.

Both filers store their WAFL, RAID and other information, as well as that of their partners, in non-volatile random access memories (NVRAMs) as part of their normal operation. The NVRAM is typically organized into two halves or segments, a local half or segment for storing requests directed to the local filer and a partner half or segment for storing requests "mirrored" from the partner. Each segment comprises a plurality of sections including RAID log, syslog and WAFL log sections. Each WAFL log consists of two portions designated log 0 and log 1.

As a file service request is processed by the WAFL file system, an entry for that request is written into the WAFL log as a journal entry. The journal entry may comprise, for example, "Create file", "Write file Data", "Open file", etc. Widely accepted file system standards, such as NFS, specify that a file server should not reply to a requesting client until a given request is written out to stable storage. By writing to NVRAM this requirement is met and a reply can be returned to the requesting client with respect to the service request before the results of the request have been written to a hard disk.

The NVRAM is temporarily loaded with service requests until such time as a consistency point (CP) is reached. CPs may occur at fixed time intervals, or when other key events arise, such as either log 0 or log 1 in the WAFL log section being filled. At such times, the accumulated contents of the log 0 or log 1 are "flushed" (written) to hard disk, thereby completing the CP.

When log 0 is filled, a CP is initiated and subsequent service request entries are stored in log 1. The entries in log 0 are then flushed to hard disk. Similarly, when log 1 is filled, another CP is triggered and subsequent service request entries are stored in log 0. The entries in log 1 are then flushed to hard disk. Once the information recorded in log 0 or log 1 are written to hard disk they are removed from the NVRAM. This process continues as each log fills, triggering a CP, and clearing the NVRAM.

After a takeover by a partner filer from a failed filer, the partner handles file service requests that have normally been routed to it from clients, plus file service requests that had previously been handled by the failed filer and that are now routed to the partner. Broadly stated, a takeover of a failed filer involves the partner filer asserting disk reservations to take over responsibility of the disks of the failed filer, and then sending a series of "please die" commands ("poison packets") to the failed filer.

The partner filer then "replays" the mirrored WAFL and RAID log entries of the failed filer stored in its NVRAM. A replay comprises flushing of the log entries to disk. As part of takeover processing the partner takes on two identities: its own identity and the identity of the failed filer. To that end, the partner activates network interfaces and network addresses that replicate the failed filer's network addresses. The identity, replicated network interfaces and network addresses are used to process service requests directed to the failed filer until the failed filer is restored and control is returned to it.

The partner filer then begins processing requests directed to the failed filer. These processed requests are temporarily stored in only the local half of the partner's NVRAM. That is, the WAFL entries for the failed filer are interleaved with WAFL entries for the partner filer in log 0 until it is full. After a CP, the entries are interleaved and stored within log 1 until it is full. Notably, only the local filer half of the NVRAM is used, while the half assigned for use of the failed filer is unused. This is clearly inefficient.

Subsequently, after correction of a failure, the "failed" filer is rebooted and resumes normal operation. That is, after the problem that caused filer failure has been cured, the failed filer is rebooted, returned to service, and file service requests are again routed to the rebooted filer. If there is a problem with the failed filer that prevents it from being rebooted, or there is a problem with other equipment to which with the failed filer is connected that prevents the rebooted filer from going back online and handling file service requests, the filer remains offline until the other problems are repaired.

Accordingly, it would be advantageous to utilize the unused half of the NVRAM during a takeover operation to increase the efficiency of the WAFL file system by providing additional NVRAM space to store log entries processed by the file system.

SUMMARY OF THE INVENTION

The present invention provides a technique for increasing the storage capacity of an NVRAM during a takeover operation, thereby enhancing the performance of a local filer when processing requests directed to a failed partner filer of a cluster. The NVRAM to is organized into two halves or segments: a local half configured to store file system information directed to the local filer, and a partner half for storing such information directed to the partner filer.

After the local filer takes over file service operations from the failed partner, the information stored in the partner half of the NVRAM is flushed to hard disk. According to the teaching of the invention, the partner half of the NVRAM is then used to provide additional NVRAM storage capacity for file system information processed during takeover. The additional capacity effectively doubles the size of the NVRAM allocated for temporary storage of processed file system information.

Specifically, each half of the NVRAM comprises a plurality of sections, including a file system (e.g. WAFL) section. The WAFL section in the local half of the NVRAM consists of two portions designated log 0 and log 1. The additional storage area is in the WAFL section in the partner half of the NVRAM that is divided into two portions designated "log 0 extension" and "log 1 extension" during takeover. The operation of interleaving WAFL information as entries in log 0 and log 1 of the local filer's NVRAM is the same as previously described with the following enhancement. Once log 0 is filled a consistency point (CP) is not initiated; rather, additional file service requests are stored in the log 0 extension. Only when log 0 and log 0 extension are both filled is a CP initiated, causing the entries to be flushed to hard disk. Thereafter, subsequent service request entries are stored in log 1 and, when it is filled, further service requests are stored in the log 1 extension. When log 1 and log 1 extension are both filled, another CP is reached and subsequent service request entries are stored in log 0 and then the log 0 extension. In this manner, half the number of CPs is invoked which increases performance while simplifying operation of the filer.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN
ILLUSTRATIVE EMBODIMENT

The inventive technique described herein may apply to any type of special-purpose (e.g., server) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It is expressly contemplated that the various processes, architectures and procedures described herein can be implemented in hardware, firmware or software, including a computer-readable medium having stored thereon program instructions that perform a series of steps.

Figure 1:
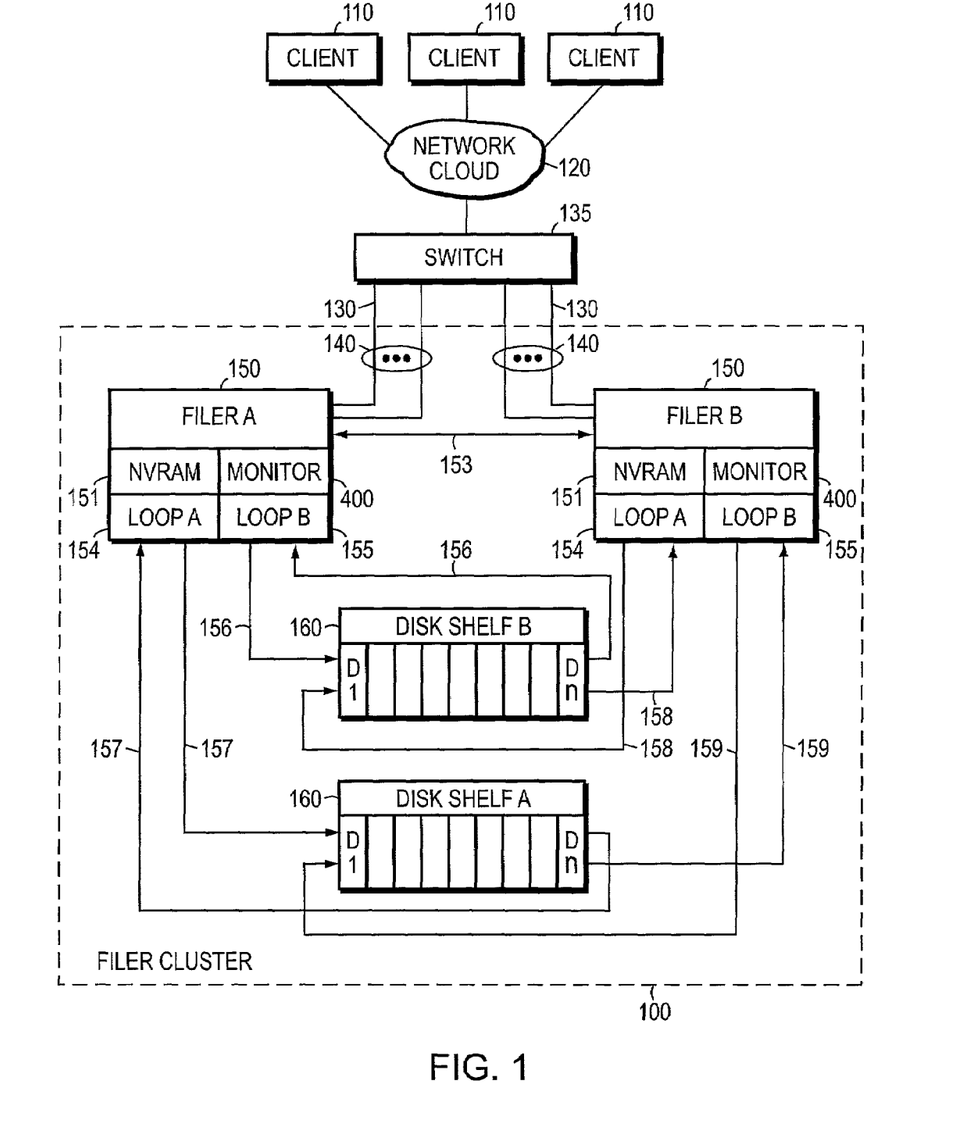
FIG. 1 is a block diagram of two filers connected in a cluster configuration that enables one filer to take over for the other filer when it experiences a problem.

FIG. 1 is a block diagram of two storage systems or filers designated filer A 150 and filer B 150 connected as two nodes in a storage system or filer cluster 100 as shown. In accordance with the teaching of the invention, filer A and filer B provide takeover to protection to each other when one fails. It should be understood that while only two filers and two disk shelves are shown in the cluster configuration shown in FIG. 1, this has been done solely for the sake of brevity, and multiple filers and disk shelves may be connected in a cluster configuration and provide takeover for each other. Further, there may be more than one RAID group and multiple volumes within multiple RAID groups associated with each filer. In this specification the terms filer, file server and storage system are used synonymously. In FIG. 1 filers A & B are preferably file servers configured to provide file services relating to the organization of information on storage devices, such as hard disks D1-Dn in disk shelves A & B 160.

A client 110 may be a general-purpose computer, such as a PC, configured to execute applications, and operating systems that include file system protocols such as NFS and CIFS. Moreover, each client 110 may interact with a filer 150 in accordance with a client/server model of information delivery. That is, a client 110 may request the services of a filer 150 to retrieve files requested by the client. Clients 110 access filers 150 in cluster 100 via network cloud 120, switch 135 and communication links 130 that may be arranged in aggregates or bundles 140. In the following paragraphs the description is often singularly referenced to filer A or B, but it should be kept in mind that the description also applies to the other filer.

As part of cluster operation, filers A & B have primarily assigned to each of them a disk shelf 160 comprised of hard disk storage devices D1-Dn that operate in a manner well known in the art. The filers are controlled by the Data ONTAP™ storage operating system available from Network Appliance, Inc. This operating system implements a Write Anywhere File Layout (WAFL) on the disk shelves.

To understand the failover operation described further in this specification, it is important to understand that filers A & B access both disk shelves A and B. Filer A accesses its disk shelf A via loop A 157, and accesses disk shelf B via loop B 156. Similarly, filer B has primarily assigned to it a disk shelf B that it accesses via its loop A 158, and it accesses disk shelf A via its loop B 159. This joint access is necessary for a non-failed filer to access a failed partner's disk shelf to continue providing file services to the clients of the failed partner after a takeover.

To implement a takeover in the event of failure of a filer, filers A & B must communicate with each other in a peer-to-peer capacity across one or more communication links, such as cluster interconnect 153. The cluster interconnect can utilize any communication medium and protocol, including a Fibre Channel and a Server Net Fail-over link, both of which are commonly known in the industry. Fibre Channel is the general name is of an integrated set of standards used for apparatus to quickly transfer data between all types of hardware in the computer industry.

Each filer has a failover monitor that continuously checks and records the status of hardware and software associated with the filer, and the current status of file service requests being processed by the filer. This information is kept in non-volatile random access memory (NVRAM) 151 in each filer. The NVRAM in each filer is organized into two halves or segments. One half (i.e. the "local half") of the NVRAM is used to store information about the hardware, operations and WAFL and RAID logs of the local filer, and the other half (i.e. the "partner half") of the NVRAM is used to store similar information of its partner that is used when the filer takes over operations for the failed partner. More particularly, WAFL log and RAID log information of a filer are stored in the local half or segment of the filer's NVRAM and similar information of the partner filer is stored in the partner half or segment of the NVRAM. The information in the NVRAM of both filers is continuously updated. However, this mode of operation makes it hard to reconfigure the partner half of NVRAM because once NVRAM is initialized, different logs with different sizes are created and there is no mechanism to "grow" these areas of NVRAM.

A local filer that has taken over from a failed partner takes over the disks and replays the WAFL and RAID log entries of the failed partner stored in its NVRAM. As part of this takeover the local filer takes on two identities: its own identity and the identity of the failed partner. In addition, the local filer also activates network interfaces and network addresses that replicate the failed partner's network addresses. The identity, replicated network interfaces and network addresses are used until the failed partner is restored and control is returned to it. When the restored filer restarts after a system failure or power loss, it replays any NFS/CIFS requests in its NVRAM that have not been flushed and stored on hard disk.

After the local filer has taken over the operations of its failed partner, and the partner's mirrored log information has been flushed from the local filer's NVRAM to hard disk, the WAFL section of the partner half of the NVRAM is used by the local filer to increase the size of its WAFL log capacity and thereby improve operation of the local filer during takeover. This operation is described in greater detail further in this detailed description.

Figure 2:
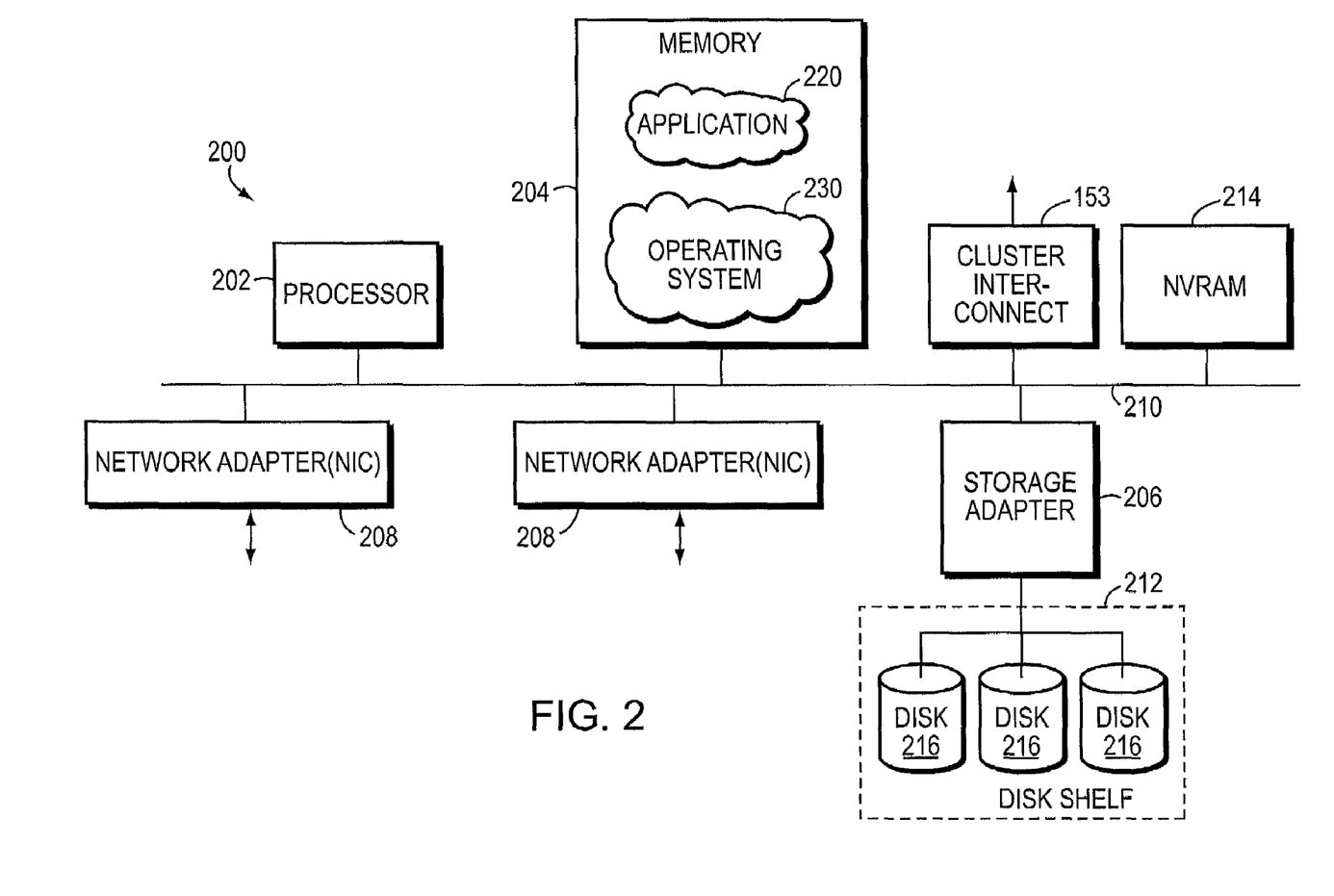
FIG. 2 is; a block diagram of a filer that may advantageously be used with the present invention.
Figure 3:
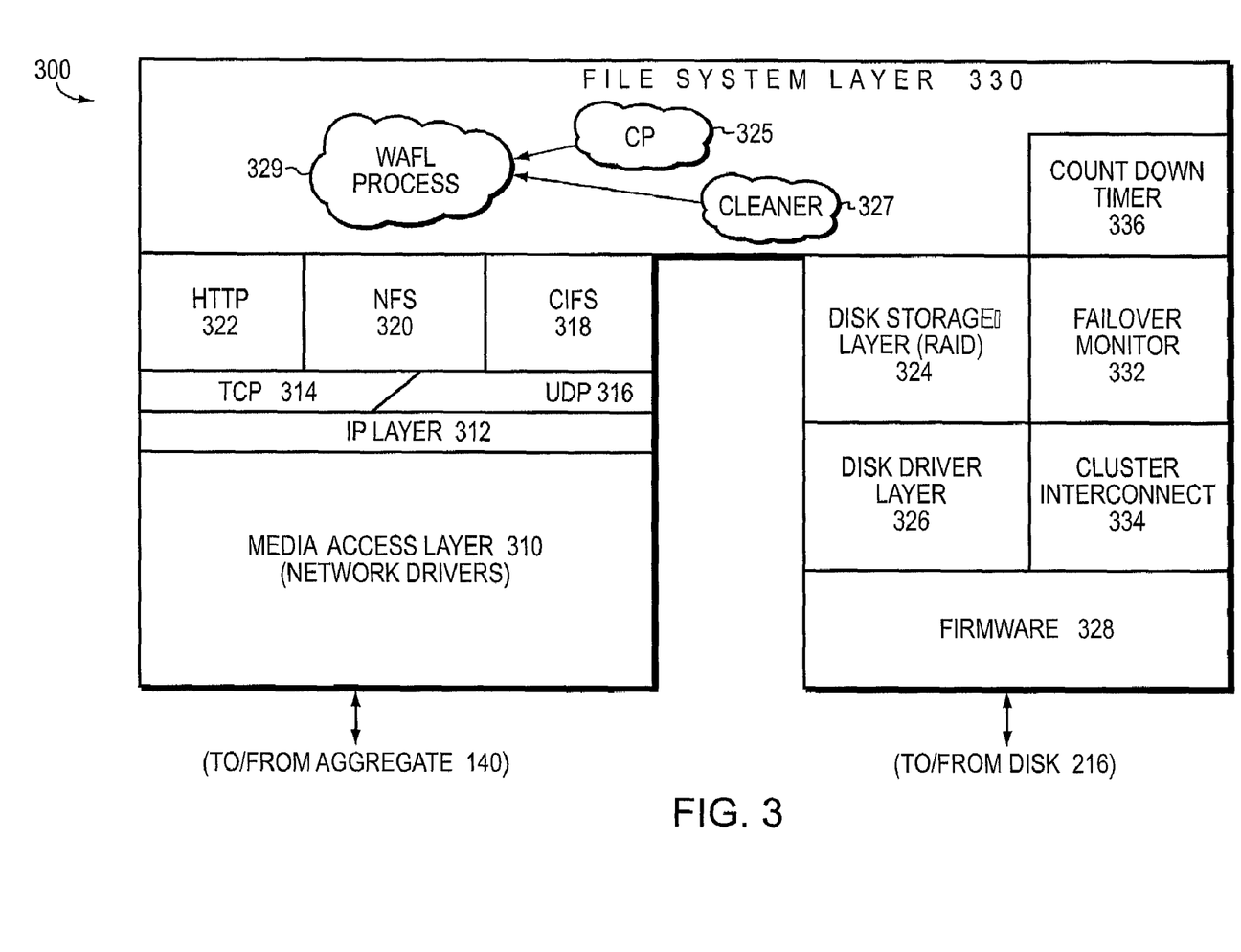
FIG. 3 is a block diagram of a storage operating system that may be advantageously used with the filers of the present invention.

FIG. 2 is a block diagram of filer 200 comprising a processor 202, a memory 204, a storage adapter 206 and at least one network adapter 208 all interconnected by a system bus 210, which is preferably a conventional peripheral computer interconnect (PCI) bus. Storage adapter 206 is connected to disks 216 via a Fibre Channel link. The filer also includes a storage operating system 230 stored in memory 204 that implements a file system to logically organize information stored as a hierarchical structure of directories and files on the disks in an assigned disk shelf 212. The filer also includes an NVRAM 214 and cluster interconnect 153. Disks in the disk shelf are typically organized as a RAID 4 (Redundant Arrays of Inexpensive Disks) array to protect against data loss caused by disk failure in a manner well known in the art. RAID arrays also improve data availability because a filer can continue operation even with a single failed hard disk. In the illustrative embodiment described herein, the operating system 230 is preferably the Data ONTAP™ storage operating system 300 available from Network Appliance, Inc. that implements a Write Anywhere File Layout (WAFL) file system on the RAID 4 array.

Memory 204 is organized into storage locations that are addressable by processor 202 and network adapters 208 for storing software application programs 220 and the storage operating system 230. The processor executes the operating system and software applications stored in the memory. It will be apparent to those skilled in the art that other processing and memory means, including various computer readable media, may be used for storing programs and executing program instructions. Details of the operating system, WAFL and RAID components, networking components and failover components are described with reference to FIG. 3. Storage operating system 230 functionally organizes the filer by invoking storage and network operations in support of the services implemented by the filer.

Storage adapter 206 cooperates with storage operating system 230 executing on processor 202 to access client requested information stored on hard disks 216. Storage adapter 206 includes input/output (I/O) interface circuitry that couples to the disks 216 over an I/O interconnect arrangement, such as a conventional, high-performance, Fibre Channel serial link topology (not shown). Storage adapter 206 retrieves the stored information, which is then processed, if necessary, by processor 202 (or storage adapter 206 itself) prior to being forwarded over system bus 210 to a network adapter 208. The network adapter 208 formats the retrieved information into packets and returns them via a network (not shown) to a client 110 (not shown) that requested the information.

Each network adapter 208 in FIG. 2 may comprise a network interface card (NIC) having the necessary mechanical, electrical and signaling circuitry needed to connect a filer to a network node switch 135 via the physical communication links 130, both shown in FIG. 1.

FIG. 3 is a block diagram of the Data ONTAP™ storage operating system 300 available from Network Appliance, Inc. The storage operating system 300 implements the specialized file server operations of the Data ONTAP™ storage operating system on each filer. The operating system comprises a series of software layers, including a media access layer 310 of network drivers (e.g., an Ethernet NIC driver) that function with network adapters 208 in FIG. 2. Operating system 300 further includes network protocol layers, such as the IP layer 312 and its supporting transport mechanisms, the Transport Control Protocol (TCP) layer 314, and the User Datagram Protocol (UDP) layer 316. A file system protocol layer includes support for the Common Interface File System (CIFS) protocol 318, the Network File System (NFS) protocol 320 and the Hypertext Transfer Protocol (HTTP) protocol 322. In addition, the operating system includes a disk storage layer 324 that implements a disk storage protocol, such as the Redundant Array of Independent Disks (RAID 4) protocol, and a disk driver layer 326 that implements a disk access protocol.

The storage operating system 300 includes additional software layers, such as cluster interconnect layer 334 for controlling the operation of the cluster interconnect link 153 between filers A & B in FIG. 1 and a failover monitor 332 that determines the state of health of the cluster partner. An open firmware layer 328 disposed over the BIOS of each operating system allows changes to boot environment variables to thereby change the way a filer boots. This is advantageous during a reboot.

Bridging the network system and file system protocol layers in the operating system is a file system layer 330 that controls storage and retrieval of data on disks in each disk shelf. The file system layer 330 includes a consistency point (CP) process 325 that handles flushing of WAFL log information in the logs 0 & 1 and log 0 & 1 extensions to hard disk, and tracking the occurrence of consistency points when a log extension 0 or 1 are filled, as described briefly in the Summary of the Invention, and described in greater detail with reference to FIG. 5. Cleaner process 327 cooperates with CP process 325 to empty logs and log extensions following their flush to hard disk at a CP. Both cleaner process 327 and CP process 325 interact with a WAFL process 329 that controls the operation and use of the logs and log extensions in accordance with function "calls" disclosed herein.

In an alternate embodiment of the invention, some functions performed by the storage operating system may be implemented as logic circuitry embodied within a field programmable gate array (FPGA) or an application specific integrated circuit (ASIC). This type of hardware implementation increases the performance of the file service provided by a filer in response to a file system request issued by a client 110. Moreover, in another alternate embodiment of the invention, the processing elements of network and storage adapters may be configured to offload some or all of the packet processing and storage access operations, respectively, from the processor 202 to thereby increase the performance of the file service provided by the filer.

If the failover monitor 332 in the local filer determines that there is a failure in the partner filer that requires it to take over the partner filer, the local filer takes over the operations of its partner. An example of a method for a filer to take over the operations of another filer is described in U.S. patent application Ser. No. 09/933,883 entitled NEGOTIATED GRACEFUL TAKEOVER IN A NODE CLUSTER, which is incorporated by reference herein.

As previously described, after a local filer takes over filer operations for a failed partner, and uses the mirror image RAID and WAFL log information of the failed partner to establish the takeover, the stored mirror information is "flushed" from the local filer's NVRAM to hard disk. When takeover is completed the failed partner no longer writes to its partner portion of the local filer's NVRAM. That portion of NVRAM is empty and priorly was not utilized during the remainder of the takeover. In the illustrative embodiment described herein, only the WAFL portion of the partner's NVRAM space is used to provide additional NVRAM WAFL log space in accordance with the teaching of the present invention. The other portions of the failed partner NVRAM space remain unused during takeover. However, it will be apparent to those skilled in the art that the remaining unused memory in the partner's NVRAM may also be used to provide additional NVRAM log space.

Figure 4:
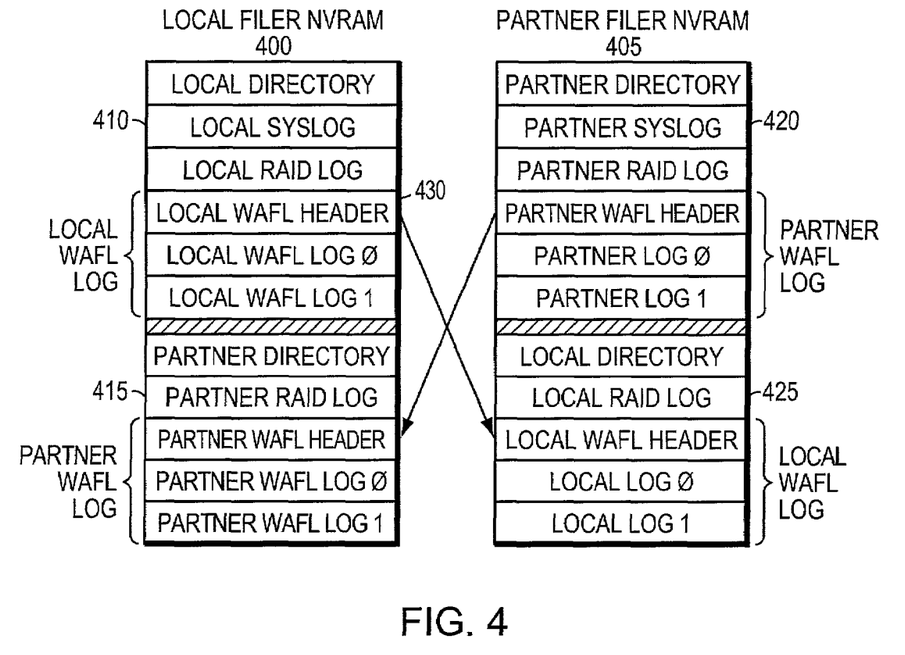
FIG. 4 shows the organization of NVRAM in each of a clustered pair of filers during normal operation.

FIG. 4 shows the organization of local filer NVRAM 400 resident in local filer A and the organization of partner filer NVRAM 405 resident in partner filer B. A segment or portion 410 ("local half") of the local filer NVRAM is used to store its syslog, RAID log and WAFL log, while segment or portion 415 ("partner half") is used to store a mirror image of the partner filer's syslog, RAID log and WAFL log information.

Similarly, segment or portion 420 of the partner filer NVRAM 405 is used to store its syslog, RAID log and WAFL log, while segment or portion 425 is used to store a mirror image of the local filer's syslog, RAID log and WAFL log information. The mirror image storage is represented by the arrows between the blocks representing the local filer NVRAM 400 and partner filer NVRAM 405. The local filer's WAFL log is stored in the "local WAFL log" 425 of the partner filer and visa versa.

The size of the WAFL log in NVRAM is variable. It is typically sized sufficiently to log either certain time-based portions of transactions (for example, 100 milliseconds), or until a log 0 or log 1 is filled. The NVRAM is filled in parallel with a buffer cache in the filer but, as described above, is cleared and refilled after each CP is initiated, representing a confirmed write to hard disk of the log data.

The WAFL logs in each NVRAM 405 and 410 have three sections: the WAFL header, log 0 and log 1. The normal WAFL operation using logs 0 and 1 is described in detail in the Background of the Invention. The WAFL header contains a plurality of data structures configured to store information pertaining to the organization and structure of logs 0 and 1 in NVRAM. For example, the data structures are configured to store information indicating: (i) the number of entries in each log, (ii) the starting and ending addresses of each log, and (iii) which log is currently in use. Note that the entries of logs 0 and 1 are generally not of a fixed length. However, each entry is of a particular type and each type of entry has a fixed length.

During takeover, the failover monitor 332 in FIG. 3 interacts with the disk driver layer 326 to assert disk reservations (i.e. change ownership of disks from the failed partner to the local filer), while the cluster interconnect 334 interacts with the failover monitor 332 to send a "please die" command to the failed partner. In addition, the WAFL process 329 interacts with CP 325 and cleaner 327 to flush the WAFL section of the partner half of the local filer's NVRAM to hard disk and reset the NVRAM log entry count to zero. The free WAFL log portion 415 of local filer NVRAM 400 is then used to provide additional NVRAM WAFL log space in accordance with the teaching of the present invention.

Figure 5:
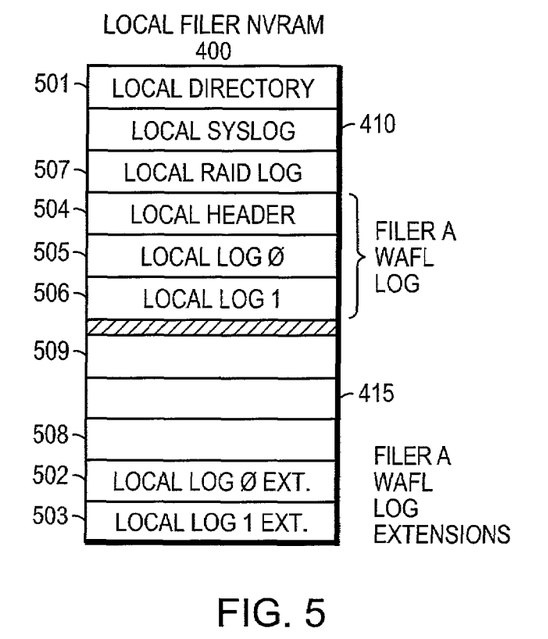
FIG. 5 shows the organization of NVRAM in a filer providing takeover service to a failed filer in accordance with the teaching of the present invention.

FIG. 5 shows the organization of local filer NVRAM 400 following takeover of service from its failed partner. To provide additional NVRAM space in local filer NVRAM 400 to be used to expand the WAFL log during a takeover, the now empty and unused partner WAFL log 0 and log 1 in partner NVRAM space 415 are re-used as WAFL log extensions 502 & 503. That is, after flushing partner information to disk, the partner WAFL log sections 502 & 503 in partner half 415 of the local NVRAM 400 are used as extensions to the local WAFL log sections 505 & 506 in local half 410 of NVRAM 400. In particular, log 0 of partner half 415 becomes log 0 extension (502) to log 0 (505) of local half 410, and log 1 of partner half 415 becomes log 1 extension (503) to log 1 (506) of local half 410. The memory size and organization of log 0 and 1 extensions 502 and 503 are the same as the memory size and organization of local WAFL log 0 and 1 in local NVRAM portion 410. The directory, syslog and RAID log memory space in the partner NVRAM space 415 remain unused after they are flushed during takeover, as represented by the blank blocks in FIG. 5.

Figure 6:
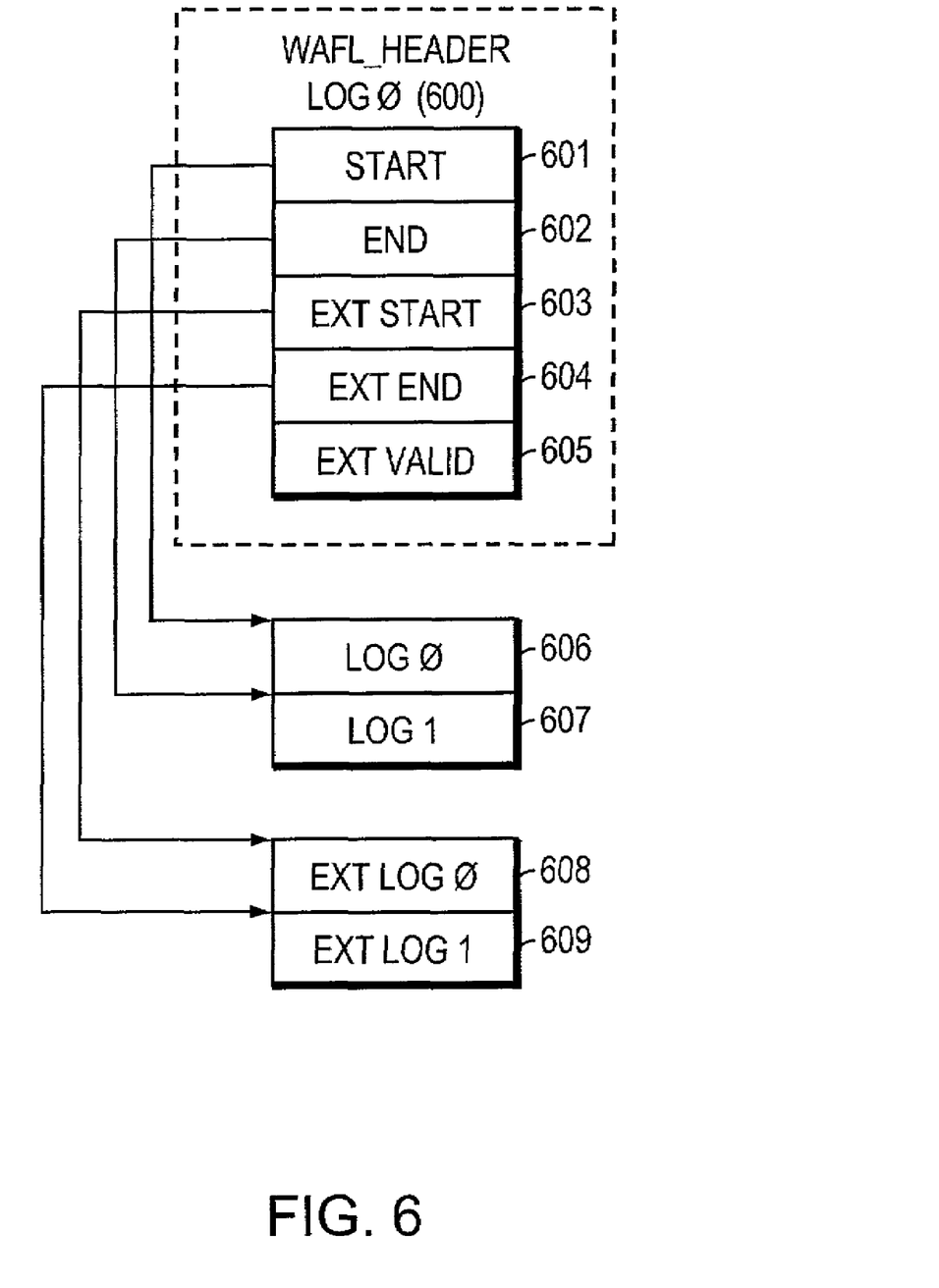
FIG. 6 is a block diagram showing the organization of a portion of the WAFL header according to the invention.

Additional information is needed in the local WAFL section header 430, indicating whether or not log 0 & 1 extensions are being used and where the extensions begin and end. According to the teaching of the invention, information is added to a data structure (e.g., WAFL_NVLOG1 Log X) in the header. The description regarding FIG. 6 provides more detail.

During takeover the operation of storing service requests in local WAFL log 0 (505) and local WAFL log 1 (506) and their extensions 502 and 503 in local filer NVRAM 400 is essentially the same as in the prior art with one difference. Once local log 0 (505) is filled, a consistency point (CP) is not initiated; rather, WAFL stores additional service requests in the log 0 extension (502). When both log 0 and log 0 extension are filled a CP is initiated. The entries in log 0 and log 0 extension are flushed to hard disk, and the log 0 and log 0 extension NVRAM locations are erased as previously described with reference to CP 325 and cleaner 327. At the same time subsequent service request entries are stored in local log 1 (506) and, when it is filled, further service requests are stored in the log 1 extension (503). When both log 1 and log 1 extension are filled another CP is initiated. The entries in the log 1 and log 1 extension are flushed to hard disk, and the log 1 and log 1 extension NVRAM locations are erased. At the same time subsequent service request entries are again stored in log 0 (505) and then in log 0 extension (502) as previously described. Both local filer and partner filer requests are interleaved as entries within the WAFL logs. Therefore, the invention essentially doubles the size of the WAFL logs during takeover, and half the number of CPs are invoked which increases performance while simplifying operation of the local filer.

In non-takeover operation, when either log 0 or log 1 is full a CP is initiated and there is a transfer to the other of the two logs as previously described. This is followed by flushing the full log's contents to hard disk, freeing those log contents from the NVRAM, and resetting the log entry count to zero. In a takeover operation, however, the WAFL file system maintains a log count to ascertain when logs 0 and 1 and their extensions are filled. Specifically, since there is no CP initiated when log 0 or 1 is filled during takeover, a WAFL log allocation routine (e.g. ALLOC_NVLOG_ENTRY) checks to the log full condition so as to be made aware of log extension use. This prevents a CP from being initiated until both a log and its log extension are filled.

In addition, when service requests are stored and replayed, the WAFL layer needs to be aware of the creation of the extensions used to store and replay entries in the extensions. To do this the number of file service entries in the original log and in the log extension must both be known. In the illustrative embodiment the number of entries are determined by counters that are maintained by WAFL, in e.g., the local WAFL header 430. For example, a first counter maintains a "primary log count" where the number of log entries in the original log is kept during takeover, whereas a second counter and the existing "entry_cnt" field (normally used to store the number of log entries in the original log) is used to track the total number of entries in the log and its log extension. The difference between these two numbers is the number of entries in the log extension. This information may be used in connection with other information contained in data structures of the WAFL header 430 to thereby enable control of the various sections of the NVRAM in accordance with the teaching of the invention.

FIG. 6 is a block diagram illustrating a WAFL data structure 600 used to control the WAFL log 0 (606) and log extension 0 (608) sections of the NVRAM. In the illustrative embodiment, the log 0 data structure is organized to store information directed to log 0 (606) and its extension Ext log 0 (608). Specifically, field 601 of the data structure contains the address (e.g. a start pointer) of the starting location in NVRAM for log 0, and field 602 contains an end pointer referencing the ending location in NVRAM of log 0.

According to the teaching of the invention, the log 0 data structure (600) is modified to include a field 603 containing an extension start pointer referencing the starting location of Ext log 0 (608) in NVRAM, and field 604 contains an EXT end pointer referencing the ending location of Ext log 0 (608) in NVRAM. In addition, a field 605 is provided to contain an Ext Valid flag indicating whether or not Ext log 0 is currently in use. The flag is set to 0 when Ext log 0 is not in use, and is set to 1 when Ext log 0 is in use.

It should be noted that a data structure similar to log 0 (600) is provided to enable access and control to log 1 (607) and its extension Ext log 1 (609).

Operation of the invention will now be described with reference to FIGS. 1-6. Assume an NFS incoming request packet is processed at the media access layer 310 and TCP/IP layer 314 in FIG. 3, prior to being forwarded to NFS layer 320, which determines the packet type. The file system layer 330 processes the request by determining the is amount of space needed to store the request in NVRAM and then calls the function ALLOC_NVLOG_ENTRY requesting an entry in log 0/1 to "log" a certain amount of data. ALLOC_NVLOG_ENTRY "knows" how much space is available in the WAFL section of NVRAM and whether the request can be accommodated in the currently used log 0 or 1. If so, an entry is created in that current log and the request data is loaded into the entry. If there is not enough space in the log 0 or 1, the entry is created in the appropriate one of log extensions 0 or 1 and the data is stored in that entry. This same operation applies to tracking space for storing entries in the log extensions.

If there is not enough space in a log extension, ALLOC_NVLOG_ENTRY returns an indication of "no space available," which then triggers a CP as logs are switched from 0 to 1, or 1 to 0. Once a CP is initiated, WAFL is switched to the other log and its extension to store further requests.

For example, when log 0 (505) is full, requests are directed to log 0 extension (502) using the extension log 0 start address 603 and without initiating a CP. New requests are then logged to log extension 0 (502) in the NVRAM. When log extension 0 (502) is full, a CP is initiated. Once a CP is initiated, WAFL is switched to log 1 (506) for use in storing requests.

The above described operation of using a failed filer's WAFL log in its partner's NVRAM for a log extension has an advantage of simplifying operations. Using the example of a local filer taking over for a failed partner filer, as reflected in the local filer NVRAM shown in FIG. 5, the offset from local header 501 to local log 0 (505) is the same as the offset from header 509 to file log 0 extension (502), and the offset from local header 501 to local log 1 (506) is the same as the offset from header 509 to file log 1 extension (503).

At some point in time whatever problem caused a partner filer to fail will be cured and the local filer will transfer file server operations back to the partner. This will occur to when either the partner filer will be repaired or rebooted, or failed equipment with which the partner functions will be repaired. The determination to giveback file server operations to the restored partner may happen in either of two ways: (1) the local filer receives a giveback_operation command from a system operator, or (2) the local filer receives a message from the partner that it has recovered from the failure and is in its rebooting state. In the latter case the local filer initiates the giveback_operation command.

For a giveback operation during a "takeover to normal" mode transition of the cluster, the invention contemplates flushing of the data in both the logs and their log extensions to hard disk. Giveback processing assumes a reverse order of operation from that followed by takeover processing. Here replay of the WAFL logs involves forcing a CP, which flushes all data of a log to disk.

Moreover, the invention further contemplates a "panic giveback" situation during takeover. A panic situation arises when there is an exception that the storage operating suystem cannot handle gracefully and continue operating. A panic situation causes the storage operating system to "halt", save the contents of memory in a core file and reboot. There are three typical scenarios one can envisage when considering a panic situation in a cluster.

1) The filer was running in normal (local, non-takeover) mode when the panic situation was encountered. In this case, the system reboots into non-takeover mode.

2) The filer was running in takeover mode for longer than PANIC_GIVEBACK_TIMEOUT seconds when the panic situation was encountered.

In this case, the system reboots into takeover mode.

3) The filer was attempting to transition from normal to takeover mode or the filer had completed the transition to takeover mode less than PANIC_GIVEBACK TIMEOUT seconds ago. In this case, if the filer were to reboot into takeover mode, it could encounter the panic situation again. This would lead to another reboot attempt, which could encounter the panic situation again. This could continue indefinitely. In order to obviate this, the filer reboots into normal mode rather than takeover mode.

The last case is interesting because the filer transitions from takeover mode to normal mode during reboot. The NVRAM of the filer initially contains requests directed to the failed partner and the log extensions are valid. All requests directed to the failed partner must be flushed to hard disk and the log extensions must be made unavailable before the transition is completed. This is accomplished by having a variable in the cluster failover monitor code configured to delay the indication that the log extensions are unavailable for use until after the contents of the NVRAM are flushed. This prevents is loss of data in the extensions.

More specifically, during giveback the state transitions go from BOTH_EXTS_VALID to ONE_EXT_VALID to BOTH_EXTS_INVALID during two CPs that are forced during the giveback operation.

In an alternative embodiment of the invention the same NVRAM method and hardware taught herein to expand NVRAM space used for WAFL logs during takeover can be used to expand NVRAM space used for RAID logs during takeover. With reference to FIG. 5, during takeover the local RAID log 507 can be filled and additional information stored in a RAID log extension 508 in NVRAM space 415 until it is filled before the RAID log information is flushed to hard disk.

In yet another alternative embodiment of the invention the logs and log extensions need not be filled in the same order as described for the preferred embodiment of the invention. For example, local logs 0 (505) and 1 (506) may be filled before a CP, then local log 0 extension (502) and local log 1 extension (503) filled before the next CP.

In another alternative embodiment of the invention the size of the local WAFL log extensions 502 and 503 can be further increased by including therein the unused partner header, partner RAID log and partner WAFL header memory locations of partner NVRAM 415.

Although the preferred embodiment of the apparatus and method of the present invention has been illustrated in the accompanying drawings and described in the foregoing Detailed Description, it is understood that the invention is not limited to the embodiments disclosed, but is capable of numerous rearrangements, modifications and substitutions without departing from the spirit of the invention as set forth and defined by the following claims. For example, the preferred embodiment of the invention described herein is used in a cluster of file servers, but the teaching of the invention may be applied to clustered servers of different types.

What is claimed is:

1. An apparatus to provide additional memory to a first server while the first server takes over providing services normally provided by a second server, comprising:
   prior to a failure by the second server, the first server having a first memory, the first memory split into two segments with a first segment storing transactions from the first server and a second segment storing transactions from the second server, wherein the first memory is internal memory of the first server;
   prior to the failure by the second server, the second server having a second memory, the second memory spilt into two segments with a third segment storing transactions from the second server and a fourth segment storing transactions from the first server, wherein the second memory is internal memory of the second server; and
   after the failure by the second server, the first server assumes the identity of the second server to allow the first server to receive requests directed to the first server and requests directed to the second server and the first server writes transaction entries to the first and second segments of the first memory prior to a consistency point flushing the transactions to one or more storage devices to effectively double the size of the first memory allocated for temporary storage of transaction entries.

2. The apparatus of claim 1, wherein the first memory and the second memory are NVRAM.

3. The apparatus of claim 1, further comprising:
   a file system, after the first server assumes the identity of the second server, configured to initiate a consistency point after both the first and the second segments of the first memory are full of transactions.

4. The apparatus of claim 1, further comprising:
   a set of storage devices configured to receive the transactions from the first and second memory segments when either the first memory segment or the second memory segment is full prior to failure of the second server.

5. The apparatus of claim 1, wherein a first server is further configured, after failure by the second server, to store the first server information including transactions directed to the second server processed by the first server in the first memory and second segments of the first memory until the first and second memory segments are full and to store the first server information in a fifth memory segment and a sixth memory segment of the first memory while the first server information stored in the first and second memory segments are transferred to a storage device.

6. A method for providing additional memory to a first server while the first storage server takes over providing services normally provided by a second server, comprising:
partitioning a first internal memory into a first segment and a second segment;
partitioning a second internal memory into a third segment and a fourth segment;
prior to a failure by the second server, writing transactions by the first server to the first segment of the first memory stored on the first server;
prior to the failure by the second server, writing transactions by the second server to the second segment of the first memory stored on the first server, wherein the first memory is internal memory of the first server;
prior to the failure by the second server, writing transactions by the second server to the third segment of a second memory stored on the second server;
prior to the failure by the second server, writing transactions by the first server to the fourth segment of the second memory stored on the second server, wherein the second memory is internal memory of the second server;
after the failure by the second server, assuming the identity of the second server by the first server, upon the second server going offline to allow the first server to receive requests directed to the first server and requests directed to the second server; and
after the failure by the second server, writing transactions in both the first segment and the second segment of the first memory by the first server prior to a consistency point flushing the transactions to one or more storage devices to effectively double the size of the first memory allocated for temporary storage of transaction entries, wherein the first server receives requests directed to the first server and requests directed to the second server.

7. The method of claim 6, wherein the first memory and the second memory are NVRAM.

8. The method of claim 7, further comprising:
initiating a consistency point after both the first and the second segments of the first memory are full of transactions, after the first server assumes the identity of the second server.

9. The method of claim 6, further comprising:
transferring the transactions from the first and second memory segments to a storage device when either the first memory segment or the second memory segment is full prior to failure of the second server.

10. The method of claim 6, further comprising:
storing, after failure by the second server, a first server information including transactions directed to the second server processed by the first server in the first and second memory segments of the first memory until the first and second memory segments are full; and
storing the first server information in a fifth memory segment and a sixth memory segment of the first memory while the first server information stored in the first and second memory segments are transferred to a storage device.

11. An apparatus for providing additional memory to a first server while the first storage system takes over providing services normally provided by a second server, comprising:
prior to a failure by the second server, means for writing transactions by the first server to a first segment of a first memory stored on the first server;
prior to the failure by the second server, means for writing transactions by the second server to a second segment of the first memory stored on the first server, wherein the first memory is internal memory of the first server;
prior to the failure by the second server, means for writing transactions by the second server to a third segment of a second memory stored on the second server;
prior to the failure by the second server, means for writing transactions by the first server to a fourth segment of the second memory stored on the second server, wherein the second memory is internal memory of the second server;
after the failure by the second server, means for assuming the identity of the second server by the first server, upon the second server going offline to allow the first server to receive requests directed to the first server and requests directed to the second server; and
after the failure by the second server, means for writing transactions in both the first segment and the second segment of the first memory by the first server prior to a consistency point flushing the transactions to one or more storage devices to effectively double the size of the first memory allocated for temporary storage of transaction entries, wherein the first server receives requests directed to the first server and requests directed to the second server.

12. The apparatus of claim 11, wherein the first memory and the second memory are NVRAM.

13. The apparatus of claim 11, further comprising:
means for initiating a consistency point after both the first and the second segments of the first memory are full of transactions, after the first server assumes the identity of the second server.

14. The apparatus of claim 11, further comprising:
means for transferring the transactions from the first and second memory segments to a storage device when either the first memory segment or the second memory segment is full prior to failure of the second server.

15. The apparatus of claim 11, further comprising:
means for storing, after failure by the second server, a first server information including transactions directed to the second server processed by the first server in the first and second memory segments of the first memory until the first and second memory segments of the first memory are full; and
means for storing the first server information in a fifth memory segment and a sixth memory segment of the first memory while the first server information stored in the first and second memory segments are transferred to a storage device.

16. A system to provide additional internal memory to a first server while the first storage system takes over providing services normally provided by a second server, comprising:
prior to a failure by the second server, the first server with a first internal memory, the first internal memory split into two segments with a first segment to store transactions from the first server and a second segment to store transactions from the second server;
prior to the failure by the second server, the second server having a second internal memory, the second internal memory spilt into two segments with a third segment storing transactions from the second server and a fourth segment storing transactions from the first server; and
after the failure by the second server, the first server assumes the identity of second server to allow the first server to receive requests directed to the first server and requests directed to the second server and the first server writes transaction entries to the first and second segments of the first memory prior to a consistency point flushing the transactions to one or more storage devices to effectively double the size of the first memory allocated for temporary storage of transaction entries.

17. The system of claim 16, wherein the first memory and the second memory are NVRAM.

18. The system of claim 16, further comprising:
a file system, after the first server assumes the identity of the second server, configured to initiate a consistency point after both the first and the second segments of the first memory are full of transactions.

19. The system of claim 16, further comprising:
a set of storage devices configured to receive the transactions from the first and second memory segments when either the first memory segment or the second memory segment is full prior to failure of the second server.

20. The system of claim 16, wherein the first server is further configured, after failure by the second server, to store a first server information including transactions directed to the second server processed by the first server in the first segment and the second segment of the first memory until the first and second memory segments are full and to store the first server information in a fifth memory segment and a sixth memory segment of the first memory while the first server information stored in the first and second memory segments are transferred to a storage device.

21. A method to provide additional memory to a first storage system while the first storage system takes over providing services normally provided by a second storage system, comprising:
prior to a failure by the second storage system, writing transactions by the first storage system to a first memory, the first memory split into two segments with a first segment to store transactions from the first storage system and a second segment to store transactions from the second storage system, wherein the first memory is internal memory of the first storage system;
prior to the failure by the second server, the second server having a second memory, the second memory spilt into two segments with a third segment storing transactions from the second server and a fourth segment storing transactions from the first server, wherein the second memory is internal memory of the second server; and
after the failure by the second storage system, assuming the identity of the second storage system by the first storage system to allow the first server to receive requests directed to the first server and requests directed to the second server, and writing, by the first storage system, transaction entries to the first and second segments of the first memory prior to a consistency point flushing the transactions to one or more storage devices to effectively double the size of the first memory allocated for temporary storage of transaction entries.

22. The method of claim 21, wherein the first memory and the second memory are NVRAM.

23. A system, comprising:
a first memory divided into two segments, a first segment and a second segment, wherein the first memory is internal memory in a first server;
a second memory divided into two segments, a third segment and a fourth segment, wherein the second memory is internal memory in a second server;
prior to a failure of the second server, the first server writes transaction entries in the first segment that were from requests directed to the first server and writes transaction entries in the second segment that were from requests directed to the second server;
prior to a failure of the second server, the second server writes transaction entries in the third segment that were from requests directed to the second server and writes transaction entries in the fourth segment that were from requests directed to the first server; and
in response to the failure of the second server, assuming the identity of the second storage system by the first storage system to allow the first server to receive requests directed to the first server and requests directed to the second server and the first server writes transaction entries to the first segment and the second segment of the first memory to allow a larger cache space for the first server while the first server receives requests directed to the first server and requests directed to the second server to effectively double the size of the first memory allocated for temporary storage of transaction entries.

* * * * *

UNITED STATES PATENT AND TRADEMARK OFFICE
CERTIFICATE OF CORRECTION

PATENT NO.        : 7,730,153 B1
APPLICATION NO.   : 10/011844
DATED             : June 1, 2010
INVENTOR(S)       : Abhijeet Gole Page 1 of 1

It is certified that error appears in the above-identified patent and that said Letters Patent is hereby corrected as shown below:

Col. 1, Line 20, please amend as shown:

figured to store information, such as[[ is]] the actual data for the Col. 3, Line 40, please amend as shown:

cluster. The NVRAM[[ to]] is organized into two halves or seg- Col. 4, Line 55, please amend as shown:

provide takeover[[ to]] protection to each other when one fails. It Col. 5, Line 38, please amend as shown:

general name[[ is]] of an integrated set of standards used for Col. 9, Line 58, please amend as shown:

[[to ]]the log full condition so as to be made aware of log exten- Col. 10, Line 39, please amend as shown:

330 processes the request by determining the[[ is]] amount of Col. 11, Line 7, please amend as shown:

server operations back to the partner. This will occur[[ to]] when Signed and Sealed this Thirty-first Day of August, 2010

David J. Kappos
*Director of the United States Patent and Trademark Office*